(12) United States Patent
Anderson et al.

(10) Patent No.: US 10,534,571 B2
(45) Date of Patent: Jan. 14, 2020

(54) OBJECT-BASED PRESENTATION SYSTEM

(71) Applicant: Xevo Inc., Kirkland, WA (US)

(72) Inventors: Ryan Anderson, Woodinville, WA (US); Satoshi Nakajima, Medina, WA (US)

(73) Assignee: Xevo Inc., Bellevue, WA (US)

(*) Notice: Subject to any disclaimer, the term of this patent is extended or adjusted under 35 U.S.C. 154(b) by 93 days.

(21) Appl. No.: 15/435,036

(22) Filed: Feb. 16, 2017

(65) Prior Publication Data

US 2018/0232193 A1    Aug. 16, 2018

(51) Int. Cl.
*G06F 3/14*    (2006.01)

(52) U.S. Cl.
CPC ... *G06F 3/1446* (2013.01); *G09G 2340/0464* (2013.01)

(58) Field of Classification Search
None
See application file for complete search history.

(56) References Cited

U.S. PATENT DOCUMENTS

| | | | | |
|---|---|---|---|---|
| 9,553,953 | B2* | 1/2017 | Sullad | H04L 67/08 |
| 2012/0242893 | A1* | 9/2012 | Akitomo | G06F 3/1446 |
| | | | | 348/441 |
| 2016/0266860 | A1* | 9/2016 | Nam | G06F 3/1446 |
| 2016/0364086 | A1* | 12/2016 | Poore | G06F 3/0481 |

* cited by examiner

*Primary Examiner* — Ifedayo B Iluyomade

(57) ABSTRACT

A presentation system is described herein. The system can include a room for playing a scene and can be made up of a collection of displays. The system can also include media players to manage the playing of content on a corresponding display of the collection of displays. The system can also include a server to distribute objects to the media players. The scene can include the objects, which may be selectively played on the displays when the scene is played on the room. The media players can receive the objects and can determine whether the objects are intended to be played on the corresponding displays as part of the scene to be played. If so, the objects can be rendered on the corresponding displays on which the objects are intended to be played, which can bypass the rendering of the scene as a whole by the system.

20 Claims, 5 Drawing Sheets

OBJECT-BASED PRESENTATION SYSTEM

FIELD

The subject matter described herein relates to presentations systems and more particularly, to object-based presentation systems.

BACKGROUND

Many establishments rely on one or more displays to provide multimedia content to their customers or clients. In some cases, a plurality of displays may be positioned adjacent to one another to create the appearance of one large display. Each display may show an image that is unique in comparison to those of the other displays, or each one may present a portion of content that forms a complete image when the displays are viewed from the perspective of a single display. In today's systems, a single device renders the content that is shown on a collection of displays, whether it is unique to a particular display or is part of one large image formed by the combination of displays. For example, if each display in a collection of displays will present a portion of an image, the single device will render the entire image and will divide the image into portions and transmit them to the displays. This technique requires significant processing power to generate the original image for a collection of displays and even if such capacity could be achieved, the scalability of the system is severely limited.

SUMMARY

A presentation system is described herein. The system can include a room configured to play a scene, and the room can be comprised of a collection of displays. The system can also include a room server and a plurality of media players communicatively coupled to the displays and can be configured to manage the playing of content on a corresponding display of the collection of displays. The room server can be communicatively coupled to the media players and can be configured to receive one or more objects and distribute the objects to the media players. The scene may include the objects, which may be selectively played on the displays when the scene is played on the room. The media players may be further configured to receive one or more of the objects from the room server and determine, at a time when necessary, whether the objects are intended to be played on at least some portion of the corresponding displays the media players manage as part of the scene to be played on the room. If the received objects are intended to be played on at least some portion of the corresponding displays as part of the scene, the media players may render the objects on the corresponding displays on which the objects are intended to be played, which can bypass the process of rendering of the scene as a whole by the presentation system.

The system may also include an application server that is communicatively coupled to the room server, and the application server can be configured to define and generate the objects and to transmit them to the room server. As an example, the objects may define one or more attributes associated with the playing of the objects. As another example, the attributes may include one or more object directives and object characteristics, and the object characteristics may include one or more of the following: object type, object retrieval information, object start time and duration, object sensory traits, object location, or object time offsets. Some of the objects may be nested under a parent object that can provide reference data for the nested objects to enable the nested objects to be grouped together as a collection of objects.

In one arrangement, the room may be defined by a logical grid comprised of logical coordinates, and the objects may be defined by the logical coordinates of the logical grid. In this example, the displays may be defined by regions of the logical coordinates of the logical grid that may be proportional to the physical sizes of the displays. The displays of the room may have predetermined resolutions. As part of rendering the received objects on the corresponding displays on which the objects are intended to be played, the media players may be further configured to render the objects to the resolutions of the corresponding displays managed by the media players. At least one of the corresponding displays managed by the media players may have a first resolution, and at least another one of the corresponding displays may have a second resolution. In this example, the first resolution does not match the second resolution, even if the different corresponding displays are the same physical size.

A system for rendering images is also described herein. This system can include a room, a first media player, and a second media player. The room may comprise a collection of displays, and the first media player may be communicatively coupled to a first corresponding display that can be part of the collection of displays and can be configured to manage the first corresponding display. The second media player may be communicatively coupled to a second corresponding display that is part of the collection of displays and can be configured to manage the second corresponding display. The first media player may be further configured to receive one or more objects and determine whether the objects are intended to be at least part of an image intended to be shown by the first corresponding display as part of a scene for the room. If the objects are intended to be at least part of the image, the first media player may render the objects only on the first corresponding display as part of the scene for the room.

Like the first media player, the second media player may be further configured to receive one or more objects and determine whether the objects are intended to be at least part of an image intended to be shown by the second corresponding display as part of a scene for the room. If the objects are intended to be at least part of the image, the second media player may render the objects only on the second corresponding display as part of the scene for the room. In addition, the first media player and the second media player may be configured to render the objects as part of the scene for the room independently of and discretely from one another.

The first media player may be further configured to render the objects on the first corresponding display based on a native resolution of the first corresponding display. Similarly, the second media player may be further configured to render the objects on the second corresponding display based on a native resolution of the second corresponding display. The system may also include a room server communicatively coupled to the first and second media players, and the room server can be configured to distribute the objects to the first and second media players.

The displays of the collection of displays may have individual resolutions, and the room has a resolution. In one embodiment, the room resolution may be dissociated from the display resolutions. As an example, the room resolution may be based on a logical grid that may employ logical coordinates. Each of the displays of the collection of displays may be defined by a region of the logical coordinates of the logical grid that can be based on the physical sizes of the displays.

A method of rendering a scene on a collection of displays, each with a native resolution, is also described herein. The method can include the steps of providing a plurality of objects that are assigned positioning information with respect to a logical grid that defines the scene and determining whether the objects, based at least in part on the positioning information, are to be included as at least part of at least some of a plurality of images that are to collectively form the scene when the images are shown on the collection of displays. If the objects are to be included as at least part of at least some of the plurality of images, the objects may be rendered for display on the collection of displays to form the scene. The rendering may be based on the native resolutions of the displays, and the native resolutions of the displays can be independent of the logical grid.

As an example, the positioning information of the objects can include logical coordinates that are part of the logical grid, and at least some of the native resolutions of the displays are dissimilar. The method can also include the steps of receiving input that includes one or more identifying characteristics of one or more persons and generating the objects based on the identifying characteristics of the person. As an example, an identifying characteristic may include a person's identity as well as the person's physical location and proximity to specific displays. The method can further include the step of rendering for display on the collection of displays the objects based on the identifying characteristics of the person when the person is within a predetermined distance of the collection of displays.

Figure 1:
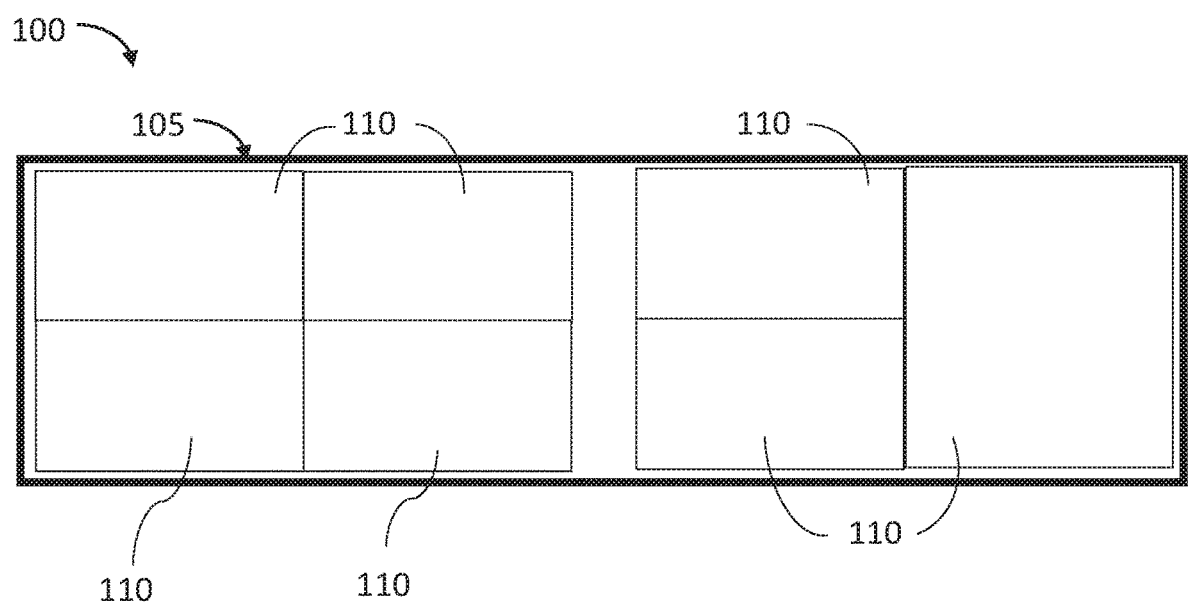
FIG. 1 illustrates an example of a room made up of a collection of displays.

For purposes of simplicity and clarity of illustration, elements shown in the above figures have not necessarily been drawn to scale. For example, the dimensions of some of the elements may be exaggerated relative to other elements for clarity. Further, where considered appropriate, reference numbers may be repeated among the figures to indicate corresponding, analogous, or similar features. In addition, numerous specific details are set forth to provide a thorough understanding of the embodiments described herein. Those of ordinary skill in the art, however, will understand that the embodiments described herein may be practiced without these specific details.

DETAILED DESCRIPTION

As previously explained, current collections of displays rely on a single device to render an entire image and split the image into numerous portions for delivery to the displays. As the number of displays in a collection increases, the required resolution for the entire image rises correspondingly, which leads to significant demands on processing power. Moreover, the image components must be sent as full images, without the ability for displays to render text or animated objects locally, reducing the amount of data that needs to be transmitted. Furthermore, if it is necessary to move a still image across the display, the image must be continuously retransmitted.

To help overcome this problem, a presentation system is presented herein. The system can include a room that can be configured to play a scene, and the room can be comprised of a collection of displays. The system can also include a plurality of media players that can be communicatively coupled to the displays and can be configured to manage the playing of content on a corresponding display of the collection of displays. The system may further include a room server that can be communicatively coupled to the media players. The room server can be configured to receive one or more objects and distribute the objects to the media players. The scene may include the objects, and the objects may be selectively played on the displays when the scene is played on the room.

The media players may be further configured to receive one or more of the objects from the room server and determine whether the objects are intended to be played on at least some portion of the corresponding displays the media players manage as part of the scene to be played on the room. If the objects are intended to be played on at least some portion of the corresponding displays as part of the scene, the media players can render the objects on the corresponding displays on which the objects are intended to be played, thereby bypassing the rendering of the scene as a whole by the presentation system.

In view of this arrangement, the system can avoid rendering a single image with a computationally burdensome resolution in favor of generating multiple images, which may collectively form a scene, at lower resolutions at a lower level (architecturally) in the system. In addition, the movement, scaling, and visibility of objects can be handled directly by the media players, avoiding the need to send the same object repeatedly simply because its position or size changes. Additional displays can be easily added to the system, making it very scalable.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. Those of skill in the art, however, will understand that the embodiments described herein can be practiced without these specific details.

Several definitions that are applicable here will now be presented. The term "object" is defined as a set of data that defines an entity that is perceivable in some form by a human when it is rendered. A "room" is defined as a collection of at least a plurality of display screens configured to selectively play at least one or more objects as part of a scene. A "scene" is defined as a collective image that is made up of a plurality of individual images. An "image" is defined as a presentation that is perceivable in some form by a human. A "display" is defined as a circuit-based machine configured to play at least objects. The term "media player" is defined as a circuit-based machine configured to render at least objects on a display. The term "render" is defined as to generate or retrieve for presentation on a display. The term "presentation element" is an element that is rendered from an object and presented in one or more human-perceptible forms.

The term "circuit-based memory element" is defined as a memory structure that includes at least some circuitry (possibly along with supporting software or file systems for operation) and is configured to store data, whether temporarily or persistently. A "communication circuit" is defined as a circuit that is configured to support or facilitate the transmission of data from one component to another through one or more media, the receipt of data by one component from another through one or more media, or both. As an example, a communication circuit may support or facilitate wired or wireless communications or a combination of both, in accordance with any number and type of communications protocols. The term "communicatively coupled" is defined as a state in which signals may be exchanged between or among different circuit-based components, either on a uni-directional or bi-directional basis, and includes direct or indirect connections, including wired or wireless connections.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). Additional definitions may be presented below.

Referring to FIG. 1, an example of a room 100 that can be made up of a collection 105 of displays 110 is shown. Although the room 100 is shown here with a rectangular shape, the room 100 is not necessarily limited to such a configuration. For example, the collection 105 of displays 110 could be positioned such that the room 100 is substantially in the shape of a square, circle, or other symbol. The room 100 may not necessarily be in a contiguous form, meaning that portions of the room 100 may be located in different areas, as physical structures, like walls, ceilings, floors, or entire buildings, may separate the different portions. In another example, an entire area, such as a lounge or foyer, may be blanketed by displays 110 that make up a room 100. In this example, each of the walls of the area may be covered by displays 110, and content may be presented on these displays 110.

The displays 110 can be configured to present various forms of content. The content can be perceived by humans and can be in any suitable form, such as images, sounds, haptics, or any combination thereof. For example, content may be one or more images only or one or more images along with sound. An image typically refers to the visual realm; however, for purposes of this description, an image may present any form of content that is capable of being perceived by a human. As an example, an image may include only visual content, only audio content, or a combination of both visual and audio content. In addition, an image may refer to an individual element of data (such as a displayed picture with a short burst of related audio) or a series of such individual elements (like streaming video with accompanying audio). The content may include any number and type of presentation elements, as will be explained later.

The displays 110 can present the content while operating in tandem with one another, or they may do so completely independent of one another. As another example, at least some of the displays 110 of the room 100 may present the content in tandem with each other, while at the same time, some of the other displays 110 may do so independently of one another. As part of presenting content in tandem with one another, the displays 110 operating in this mode may be synchronized in accordance with one or more routines. Because the room 100 is a collection of displays 110 that may present content (whether independently or in conjunction with one another) as a whole, the room 100 may also be referred to as a virtual display.

As is known in the art, a display may have a picture resolution that is determined by the number of pixels the display contains, and manufacturers of these devices produce displays with varying resolutions. In one embodiment, the resolutions of the displays 110 of the room may each have the same resolution. In other embodiments, however, the resolutions of at least some of the displays 110 of the room 100 may be different from that of one or more other displays 110 of the room 100. For purposes of this description, the resolution of a display 110 may be referred to as picture resolution or physical resolution. The physical resolution for which a display 110 was designed may be referred to as a native resolution. In addition, the displays 110 of a room 100 may form a combined resolution. In particular, the total number of horizontal pixels for these displays may be summed together to create a single horizontal resolution. A combined resolution may be realized for the vertical pixels, as well. For example, if each of four displays contains 1,080 horizontal pixels, the combined horizontal resolution for the displays 110 would be 4,320 pixels. Although only four displays 110 are presented in this example, this concept may apply to the entire collection 105 of displays 110. As an option, the picture or physical resolution of a display 110 may be based on elements other than pixels. An example of such an element includes units of measure.

In one arrangement, the room 100 may present or play any number of scenes. A scene can be formed by the content that is collectively presented by the displays 110. For example, each display 110 of the collection 105 may show a portion of an overall image, and collectively, these portions may form a scene for the room 100. Although a scene may be a coherent image, such as a human face, a nature setting, or a background of a uniform color, scenes may be comprised of one or more disparate or discrete images. For example, the displays 110 may simultaneously show content from different broadcast channels, and the disparate images of the displays 110 may still be considered to form a scene.

Although a scene may include a collection of visual images, a scene may include other perceivable content or may even be devoid of visual images. For example, a scene may include a combination of visual images and audio or visual images, audio, and haptics. As another example, a scene may be a collection of only audio content in which each of the displays 110 plays one or more predetermined sounds. In this example, the sounds broadcast by the displays 110 may be the same sounds, or at least some of the sounds may be different from one another. Likewise, a scene may be a collection of similar or dissimilar haptics. Additional examples of scenes and images will be presented below.

Figure 2:
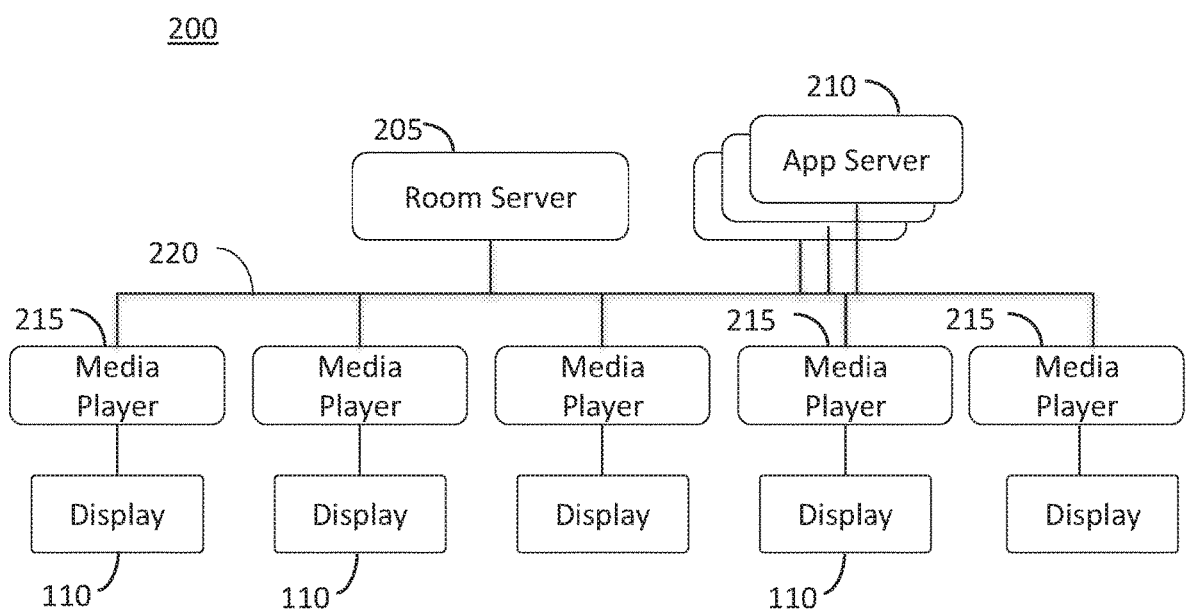
FIG. 2 illustrates an example of a presentation system.

Referring to FIG. 2, a block diagram of an example of a presentation system 200 is shown. In one arrangement, the system 200 can include one or more room servers 205, one or more application servers 210, one or more media players 215, and a plurality of the displays 110 of the room 100. In addition, the system 200 may include one or more networks 220 that can enable bi-directional communications between the different components of the system 200. Although the network 220 is shown here as a wired configuration, the network 220 may also be a wireless network or a combination of wired and wireless networks.

The room server 205 may be communicatively coupled to the application servers 210 and the media players 215 and may be configured to manage or oversee certain features of the system 200. For example, the room server 205 may be responsible for managing certain forms of content to be presented or played on the system 200. As a specific example, the room server 205 may accept one or more objects to be (when rendered) selectively presented on the system 200 and may manage these objects. As part of managing the objects, the room server 205 may maintain a complete set of objects that have the potential to be played on the system 200 and can receive and apply updates to these objects. The room server 205 is not limited to managing objects, as it may be responsible for other forms of content.

In one arrangement, the application servers 210 may be configured to create the objects and distribute them to the room server 205. The application servers 210 may organically create the objects or may retrieve or reference data from one or more external sources to do so (or both). For example, the application servers 210 may retrieve multimedia data from a third-party content site or database and may rely on this data to construct the objects. As will be explained later, the application servers 210 may also receive data from one or more sensors (not shown here) and use this data to generate the objects. No matter how the objects are created, once they are, the application servers 210 may send them to the room server 205. Moreover, the application servers 210 may also be configured to generate updates to the objects that are maintained by the room server 205 and to deliver them to the room server 205.

The application servers 210 are not necessarily limited to providing objects to the room server 205, as they may distribute other forms of content to the room server 205. For example, the application servers 210 may store and stream media to the media players 215 or other components of the system 200. In addition, the application servers 210 may retrieve this additional content from any other source or may organically generate such content themselves.

In one example, an application server 210 may be located remote to the room server 205 and may exchange data with the room server 205 over the network 220 or some other communication infrastructure. In another example, the application server 210 may be a process that is co-resident with a room server 205 or some other machine and can communicate with the room server 205 (or other machine) via a local interface. Similarly, the room server 205 may be a process that is co-resident with some other machine (such as the media players 215) in which communications are handled through a local interface, such as a local socket or some other inter-process communication mechanism.

The media players 215 may be configured to manage the playing of content on one or more of the displays 110. A display 110 whose content is managed by a media player 215 may be referred to as a corresponding display 110 with respect to that particular media player 215. As shown here, each media player 215 may manage the content of a single corresponding display 110. A single media player 215, however, may manage the content of a plurality of corresponding displays 110. In one arrangement, the media players 215 may be communicatively coupled to the room server 205 through the network 220. For example, the room server 205 may run on a web server, and each media player 215 may maintain a transmission control protocol (TCP) socket connection to the room server 205 with which it is configured. As such, the media players 215 may connect to the room server 205 as clients, with secure connections available if necessary. As another example, if a data communications network is used to couple the room server 205 with the media players 215, arbitrary distancing and bridging may be available (as opposed to a point-to-point HDMI link). This arrangement can ensure reliable delivery of content to the media players 215. In addition, the room server 205 may maintain a listing of the media players 215 that it serves, which may be updated as media players 215 are added to or removed from the system 200.

In one embodiment, the room server 205 may distribute the objects to the media players 215. In one specific example, the room server 205 may distribute each object it manages to each of the media players 215 of the system 200, although as an option, such distribution may be done in a selective manner. The room server 205 may also distribute other forms of content to the media players 215 in a similar fashion. In another embodiment, the media players 215 are responsible for determining whether an object should be rendered on its corresponding display 110 at a particular time and for rendering such object on the corresponding display 110. Like the application servers 210, the media players 215 may be remotely located with respect to the room server 205 or co-resident with the room server 205 in which communications are handled via a local interface.

In another arrangement, the system 200 may include one or more media servers (not shown). The media servers may be configured to store and stream media to the media players 215 if the application servers 210 are not configured to handle this task. In addition, the media servers may generate this content organically or retrieve it from some other location (or both).

As noted earlier, the displays 110 may form a room 100. In one example, the system 200 may include multiple rooms 100. In such an arrangement, a single room server 205 may manage each of the rooms 100, although multiple room servers 205 may be implemented to manage the rooms 100. If multiple room servers 205 are deployed, each of them may manage a single room 100 of the multiple rooms 100, or any number of the room servers 205 may be responsible for any number of rooms 100. In either case, if necessary, a media player 215 may provide a room identification to its assigned room server 205. A media player 215 may also send to the room server 205 information related to the section of the room 100 that the media player 215 manages. Additional detail on this process will be provided below.

At least some content (including objects, when rendered) may need to be synchronously presented on the system 200. Accordingly, the media players 215 may maintain synchronized clocks, which may be synchronized with their assigned room server 205. The room server 205, therefore, may be considered the master clock for the system 200. Synchronization of a media player 215 may take place when it connects to the room server 205. As an example, the media player 215 may rely on a protocol, such as or like the Simple Network Time Protocol (SNTP), in which it may request the time from the room server 205 and offsets the result by half of the round-trip time for receiving the data. Other protocols or algorithms, like Cristian's algorithm, the Network Time Protocol (NTP), the Berkley algorithm, or the Precision Time Protocol (PTP) may be used. If the time of day must be accurately kept, as opposed to simply maintaining consistency of time between or among the media players 215, the room server 205 may rely on the NTP to synchronize with NTP time servers. Any other component of the system 200 may rely on clocks that are internal or external to the system 200.

Any one of the components of the system 200 (or any other component of other systems or devices described herein) may rely on any number of processors to oversee its operation, including the coordination of various processes. Any suitable architecture or design may be used for these processors. For example, a processor may be implemented with or as one or more general-purpose and/or one or more special-purpose processors, either of which may include single-core or multi-core architectures. Examples of suitable processors include microprocessors, microcontrollers, digital signal processors (DSP), and other circuitry that can execute software or cause it to be executed (or any combination of the foregoing). Further examples of suitable processors include, but are not limited to, a central processing unit (CPU), an array processor, a vector processor, a field-programmable gate array (FPGA), a programmable logic array (PLA), an application specific integrated circuit (ASIC), and programmable logic circuitry. A processor can include at least one hardware circuit (e.g., an integrated circuit) configured to carry out instructions contained in program code. In arrangements in which there is a plurality of processors, such processors can work independently from each other or one or more processors can work in combination with each other.

Additionally, any system or component of such system may include one or more communication circuits to enable or facilitate the exchange of data with other components, systems, or networks. For example, communication circuits that support wired or wireless (or both) communications may be used, including for both local- and wide-area communications. Examples of protocols or standards under which the communications circuits may operate include Bluetooth, Near Field Communication, and Wi-Fi, although virtually any other specification for governing communications between or among systems, devices, and networks may be applicable. Although the communication circuits may support bi-directional exchanges between the components, systems, and networks, one or more (or even all) of such circuits may be designed to only support unidirectional communications, such as only receiving or only transmitting signals.

Any of the components or systems described herein may include one or more circuit-based memory elements, which can include any number of units and type of memory for storing data. As an example, a circuit-based memory element may store instructions and other programs to enable any of the components and systems to perform their functions. As an example, a circuit-based memory element can include volatile and/or non-volatile memory. Examples of suitable data stores here include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. A circuit-based memory element can be part of a processor or can be communicatively connected to the processor (and any other suitable components) for use thereby.

Figure 3:
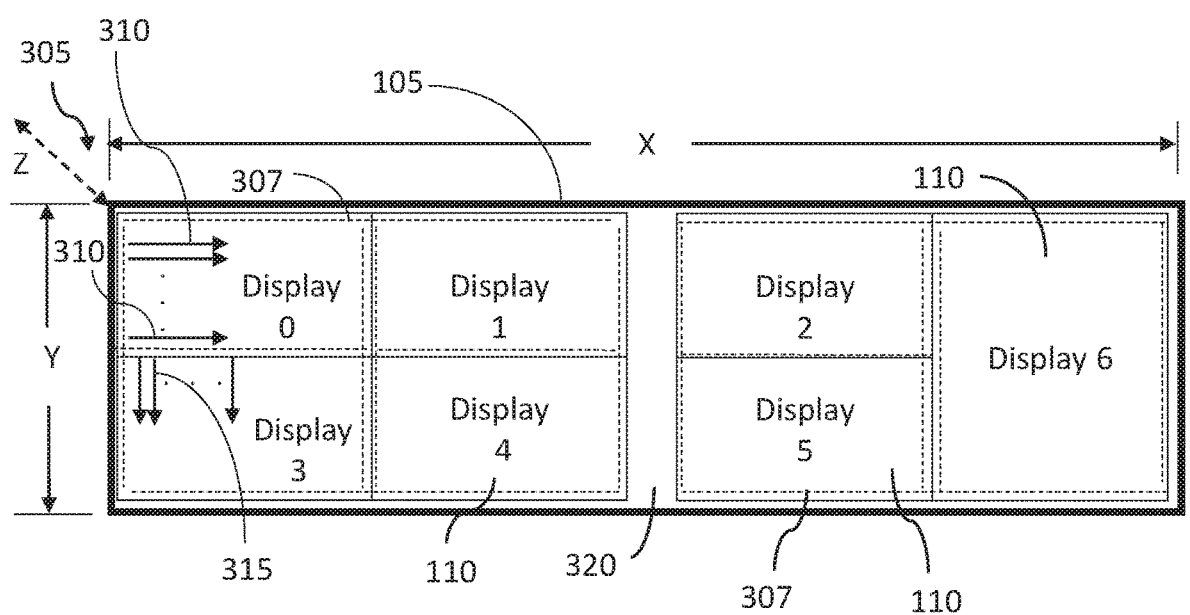
FIG. 3 illustrates another example of a room made up of a collection of displays.

Referring to FIG. 3, an example of another room 100 made up of a collection 105 of displays 110 is shown. The number of displays 110 that makes up the room 100 or the proportions of their sizes in this example are not intended to be limiting; rather, this particular configuration is meant to illustrate some of the principles and features of a presentation system. As part of the description of FIG. 3, reference may be made to FIG. 2, although the description here may apply to systems that are different from that shown in FIG. 2.

In one embodiment, a logical grid 305 may facilitate the presentation of content on the room 100 by serving as a logical coordinate system with respect to the room 100. The term "logical grid" is defined as a system that provides a reference for positioning content for the presentation of the content. As an example, the logical grid 305 may employ logical coordinates, which may represent the smallest divisible units of the grid 305, and the logical coordinates may serve as positioning descriptors for the presented content with respect to the grid 305. The logical coordinates, however, are not necessarily required to represent the smallest divisible units of the logical grid 305. In this case, the logical grid 305 may be defined by X and Y axes, and the number of horizontal (or X) and vertical (or Y) logical coordinates can determine a logical resolution for the room 100. In one embodiment, the value of the logical coordinates may successively increase (from left to right) along the X axis in accordance with their granularity. Similarly, the value of the logical coordinates may successively increase (from top to bottom) along the Y axis, with adherence to their granularity maintained.

The scope of the logical grid 305 and its logical coordinates may be arbitrarily defined. In one example, the spatial coverage of the logical grid 305 may be commensurate with the overall area of the room 100. That is, the area of the logical grid 305 may be roughly the same as the physical sizes of all the displays of the collection 105 combined, in a two-dimensional sense. As an option, the scope of the logical grid 305 may be greater than the combined coverage area of all the displays 110. Further, the overall shape of the logical grid 305 is not necessarily required to match that of the room 100. For example, although the logical grid 305 shown in FIG. 3 is in the shape of a rectangle, the logical grid 305 is not necessarily limited to this arrangement, either in this example or with respect to other rooms 100 with different configurations. Irrespective of the size of the logical grid 305, because the logical coordinates may be arbitrarily defined, they may not necessarily correspond to or represent any physical or real-world unit or element.

Alternatively, the logical coordinates may indeed correspond to or represent suitable physical units or elements, such as pixels of a display or units of measure. For example, the logical coordinates may correspond to pixels, and the number of logical coordinates that are part of the logical grid 305 may be about equal to the combined number of pixels that would be realized for the room 100 for a particular resolution if it were a single display. (Some differences between the number of logical coordinates and the total number of pixels may be present in view of gaps that may exist between the displays 110, a concept that will be explained below.) As another example, the logical coordinates could represent inches or millimeters, and the number of logical coordinates could be based on the overall physical size of the room 100. Once a logical grid 305 is established, it may be adjusted, which can be done if the physical size of the room 100 changes or even if it does not.

In one arrangement, a display 110 of the room 100 may be defined by a region 307 of logical coordinates of the logical grid 305. The region 307 may match or be proportional to the physical size of the display 110 and aligned with the positioning of the display 110 with respect to the overall configuration of the room 100. Consider the display 110 labeled as display 0 in the upper left of the room 100 of FIG. 3. In this example, the logical coordinates that are within a region 307 of the logical grid 305 that approximately matches the physical area of display 0 and whose positioning aligns with that of display 0, in this case, the upper left of the logical grid 305. By being defined by a region 307 of logical coordinates, a display 110 may be responsible for presenting content that is characterized by one or more logical coordinates that fall within the region 307.

Depending on the logical resolution employed by the logical grid 305, a region 307 of logical coordinates that defines a display 110 may comprise several horizontal rows 310 and some vertical columns 315. (Only a portion of the possible number of horizontal rows 310 and vertical columns 315 are shown here.) Similar to the X and Y axes, the logical coordinates along the rows 310 (from left to right) and the columns 315 (from top to bottom) may successively increase. Thus, in addition to a physical resolution, a display 110 may have a logical resolution. Although the number of rows 310 and columns 315 may be proportional to the physical size of a display 110, these numbers may or may not correspond to or otherwise match the number of horizontal and vertical pixels for the display 110. As such, because the logical resolution of a display 110 may be set to not match or correspond to the physical resolution of the display 110, the logical resolution of a display 110 may be independent of or otherwise disassociated from the physical resolution of the display 110.

If desired, each of the displays 110 of the room 100 may be defined by a region 307 of logical coordinates, which may comprise a number of the rows 310 and columns 315 based on the overall logical resolution of the room 100. In this example, the logical coordinates of the region 307 of logical coordinates may successively increase in value along the rows 310 and columns 315 across the display 110. In one arrangement, the initial logical coordinate of a region 307 of logical coordinates for a row 310 or a column 315 for one display 110 may have a value that is successive to that of the last logical coordinate for the respective row 310 or column 315 of the preceding display 110. As an example, this feature may be realized if the two displays 110 are contiguous to one another (in a physical sense) in the room 100.

Consider the displays 110 of FIG. 3 labeled as display 0 and display 1, for example. These displays 110 may be contiguous to one another because they are positioned next to each other in the room 100. Here, the regions 307 of logical coordinates that define display 0 and display 1 may also be contiguous. For example, the initial logical coordinate in each of the rows 310 of display 1 may have a value that is successive to that of the last logical coordinate for each of the respective rows 310 of display 0. As a more specific example, assume each of the rows 310 of display 0 traverses a total of 1,000 logical coordinates, meaning the initial logical coordinate may have a value of 0 and the last logical coordinate along the rows 310 for display 0 may have a value of 999. Continuing with this example, the initial logical coordinate along the rows 310 of display 1 may have a successive value of 1,000. Assuming the rows 310 of display 1 are defined by 1,000 logical coordinates, the last logical coordinates for the rows 310 of display 1 may each have a value of 1,999. This principle may also extend to the logical coordinates in the columns 315 of display 0 and display 1 and to each of the other displays 110. Of course, the displays 110 are not required to have the same physical size, meaning the number of logical coordinates in their regions 307 of logical coordinates may not necessarily be equal. Even so, however, the values for the adjacent logical coordinates for these differently sized displays 110 may still be successive, as described herein.

In one embodiment, the region 307 of logical coordinates may define a display 110 based on the viewing surface or screen of the display 110. Referring to the example above, assume the screens of display 0 and display 1 extend to the edges of both. As an example, both display 0 and display 1 may have no supporting frame surrounding their screens, and as such, their screens—and (hence) their regions 307 of logical coordinates—may be contiguous. In some cases, a gap 320 may still be present between the two viewing areas. Nevertheless, in view of this configuration, if any such gap 320 is small enough and the granularity of the logical grid 305 is large enough, no logical coordinates may need to be reserved or allocated for the gap. As such, the example successive values for display 0 and display 1 presented above (999-1,000) may still apply.

In other cases, however, the gap 320 between two adjacent displays 110 may be relatively large. These displays 110 may still be considered contiguous displays 110, as they may remain consecutively positioned within the room 100 (i.e., no other display 110 is positioned between them). If the gap 320 exceeds the granularity of the logical grid 305, one or more logical coordinates may be allocated or reserved for the gap 320. In one arrangement, these logical coordinates may not be considered part of the region 307 of logical coordinates for any display 110 of the room 100. As an example, a gap 320 may arise from the structural frame surrounding a display 110, one or more speakers of the display 110, or other portions of the display 110 that are not used for displaying visual content. As another example, other things may account for the gap 320, such as a frame that supports the overall room 100 or if open space is located between the contiguous displays 110.

If logical coordinates are allocated to a gap 320, the logical coordinates of the region 307 for one display 110 may still be considered to have successive values with respect to the logical coordinates of the region 307 for another display 110. For example, consider display 1 and display 2 of the room 100, which may be contiguous with respect to one another with a gap 320 positioned between them. Continuing with the example, the last logical coordinates for the rows 310 of display 1 may have a value of 1,999, and the initial logical coordinates of the respective rows 310 of display 2 may have a value of 2,000. As such, logical coordinates 2,000-2,099 may have been allocated to the gap 320. The values for the initial logical coordinates of display 2, however, may still be considered successive to the last logical coordinates of display 1, starting at 2,100. As such, the values of logical coordinates may be considered successive if a gap 320 exists between them. In such a scenario, the determination of whether the values of logical coordinates for a plurality of displays 110 are successive may be based on the viewing areas of the displays 110. As will be explained later, the logical coordinates of the regions 307 and (optionally) those allocated to any gaps 320 may serve as the basis for presenting content on the room 100.

In view of the description above, a logical grid 305 may be effectively partitioned onto the displays 110 of a room 100. By relying on logical coordinates associated with the logical grid 305, a positioning system may be realized with respect to the room 100 and each of the displays 110 of the room 100. This positioning system may then serve as a reference for determining where content is to be presented on the displays 100. Moreover, because the logical grid 305 may be arbitrarily defined, displays 110 of virtually all sizes and shapes may be part of the room 100, including one with a non-rectangular profile. The logical grid 305 may be easily updated to accommodate additional displays 110 or the replacement of a display 110 with one of a different size.

As noted earlier, the logical resolution of the logical grid 305 may be independent of the physical resolutions of the displays 110. This feature may apply to each individual display 110, as well as the combined physical resolutions of a plurality of displays 110 that may make up a room 100. Any content that may be shown on the displays 110, however, may be done so at the native resolutions of the displays 110. Accordingly, the presentation system 200 is not required to scale visual content, no matter the native resolutions of the displays 110. This concept also permits the displays 110 of the room 100 to have differing native resolutions, and a display 110 with a certain native resolution may be replaced with a display 110 having a different native resolution.

In the description above, the logical grid 305 may be defined by X and Y axes. To expand the logical grid 305 in a dimensional sense, the logical grid 305 may be further defined by a Z axis, which may be represented by the dashed line in FIG. 3. Like the X and Y axes of the logical grid 305, the Z axis may be arbitrarily defined and may be updated after its initial setting. In one arrangement, the region 307 of logical coordinates related to a display 110 may include logical coordinates along the Z axis, in addition to the X and Y axes. In view of the Z axis, the positioning system employed here may be three dimensional, which can afford the use of depth in the positioning of content on the room 100. For example, the presentation of the content may call for an object (when rendered) to be positioned in front of or behind another object. Such a feature may be realized by assigning different depth or Z (logical) coordinates to the objects.

Figure 4:
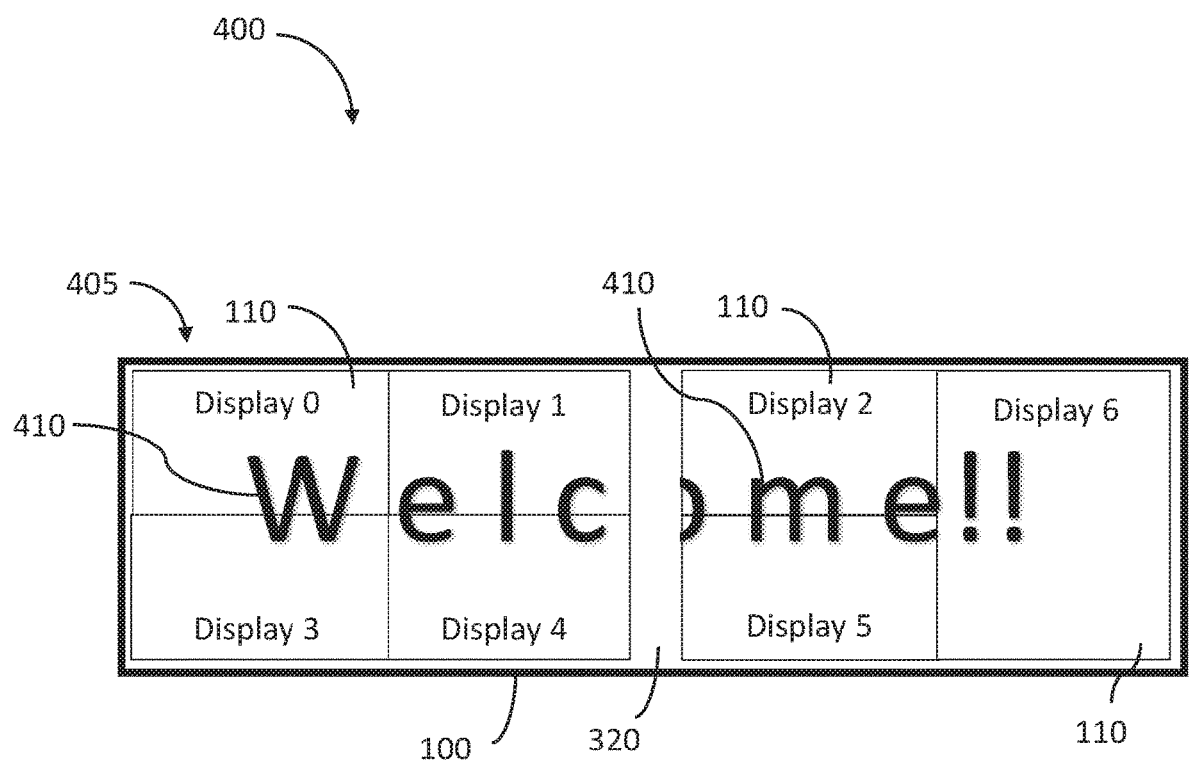
FIG. 4 illustrates an example of content being presented on a room.

Reference will now be made to FIGS. 1-4 to describe some examples of the presentation of content on a room 100. In FIG. 4, an example of content 400 being presented on the room 100 is shown. Prior to describing these examples, additional information about the presentation system 200 will be provided.

In one arrangement, a media player 215 may be assigned the region 307 of logical coordinates for the corresponding display(s) 110 that the media player 215 manages. The media player 215, in this example, may then determine whether the content that it has received should be rendered on its corresponding display 110 based on the region 307 of logical coordinates. As mentioned above, some of the content may include one or more objects, and the media players 215 may receive a set of objects from the room server 205. The media players 215 may determine whether an object should be rendered to enable it to be played on the corresponding display 110 that the media player manages. If an object is rendered, a sensory effect experienced by a user in relation to the rendering may be referred to as a presentation element. As an example, the media player 215 may render an object to permit a graphical representation of the object to be visible on the corresponding display 110. In one arrangement, each media player 215 may determine which of the objects it has received are to be rendered on its corresponding display 110, which can enable a synchronized presentation to be played on the room 100. When an object is played or presented on a display 110 or the room 100, such an event may refer to the object being rendered and producing the sensory effects (or presentation elements) associated with or defined by the object. This principle may also apply to other forms of content.

An object can be defined using any suitable syntax and can include various types of data that are related to its presentation on the room 100. One example of a suitable syntax is Javascript Object Notation, or JSON. When rendered, an object can take on any number of human-perceptible forms for presentation on the room 100. For example, an object may be (when rendered) a graphical representation, such as a text-based message, a geometric shape, an image, or a video clip, that can be presented on the room 100 and seen by a human. As another example, the object, when rendered, may be one or more sounds, such as music, speech, or digitally generated effects, that can be broadcast through the room 100. When rendered, the object may also be presented as one or more haptics, such as the application of vibrations or any other tactile sensations, which may be felt by a human during the presentation. The object, when rendered, may also be presented as any combination of these examples, and other sensory perceptions may serve as the presentation. Whatever form the object takes upon rendering, the representation may occupy or be otherwise associated with a certain portion of the room 100 and may have a defined lifespan.

As part of its composition, an object may define one or more attributes associated with its playing or presentation on the room 100. The attributes may include lists or sets of attributes. Descriptions of the attributes of an object may also be applicable to any presentation elements that may originate from the rendering of the object. In one arrangement, the attributes can include one or more object identifiers, object directives, and object characteristics. An object identifier may be a unique identification that can be assigned to an object. An object directive may be a directive, command, or defined operation that creates an object or modifies an existing object in some manner. Examples of object directives include an add directive, a remove directive, and a patch directive. The add directive may define a new object or cause an existing object to be overwritten, and a remove directive may cause an existing object to be deleted. A patch directive may cause an existing object to be modified by overwriting or updating one or more of its attributes. Other examples of object directives may also be applicable here.

An object characteristic may be information that specifies one or more properties of an object. Examples of object characteristics can include object type, object sensory traits, object retrieval information, object start time and duration, object location, and object time offsets, at least some of which may be associated with the presentation elements of the object. The object type can identify the overall form of the object, such as whether it is an image (visual), a graphical shape, audio, text, or video (or any combination of the preceding). An object sensory trait can include information related to the human-perceptible form taken by the object. Examples include color, size, opacity, font, decibel level, or amount of force of vibration, although many other properties may apply here. The object-retrieval information may identify a reference to some resource, like a uniform resource locator (URL). In this example, the media player 215 may connect to and fetch the content from the specified location. This characteristic may be relevant to images (visual), video, audio, or other content in which it may be more efficient to access the data from a location, as opposed to organically creating the content at the media player 215.

The object start time and duration may define the timing of the presentation of the object in the room 100, such as part of a scene. For example, a duration of an object may be set to a definitive amount of time, or it may be defined as forever, such as relative to a particular scene or other presentation on the room 100. In some cases, the presentation of the object may be associated with an animation sequence. If so, the duration may also identify a duration time for each iteration of the sequence. Although the duration times of each iteration may be equal, as an alternative, the duration times for separate iterations may be different from one another. In addition, a start and stop time (if a stop time is required) may be relative to some reference time kept by the presentation system 200, such as the time maintained by a synchronization clock of a media player 215. In this example, the start and stop times may be defined by offsets based on the time of the synchronization clock. As another example, the start and stop times may be based on true time, which may be synchronized by any suitable clock.

The object location may identify the presentation location of the object with respect to the logical grid 305. As an example, the presentation location of the object may remain stationary for a certain amount of time, including for the entire length of a scene. In other examples, the presentation location of the object may change at certain time intervals in any number of scenes. Depending on the length of these time intervals, the ordering of the presentation locations of the object may result in an animation sequence with respect to the element that is played on the room 100. In either example, if the object is to not be part of a scene or some other presentation, the object location may have a setting that indicates this arrangement. As an object may be associated with various forms of human-perceptible presentations, the object location may establish the positioning of effects other than simply visual elements.

In one arrangement, the object location may comprise a number of logical coordinates that may originate from the logical grid 305. For example, the logical coordinates may be selected from any of the X, Y, and Z coordinates of the logical grid 305. If a depth position is to be defined for the object, the Z coordinates may be employed for this purpose. To support changes in the presentation location of an object over time, the logical coordinates may be assigned one or more time offsets. In one embodiment, a time offset may rely on the object start time or its duration as its reference. For example, if a set of X and Y logical coordinates are assigned a time offset, the X and Y coordinates may establish the presentation location of the object when their time offset is reached. Although a complete set of logical coordinates for the object may be part of the object location, a set of reference coordinates may establish the initial presentation location and positional offsets from these reference coordinates may be used to identify future presentation locations. As such, the object location may include any suitable type of location and timing information with respect to the object.

Consider the following example in which an object may be part of a presentation on the room 100, and the object may appear as an animated visual element on the room 100. The object may have an object type and an object sensory trait that define it as a circle with a radius of 75 logical coordinates, an orange color, and an opacity of 50%. Because this object may be rendered locally by the media player 215, the object retrieval information may be left blank or null. In addition, the object start time and duration may establish a starting time that can serve as a reference time, and the duration may be infinite, meaning the presentation of the object may remain part of a scene for the entire length of the scene. Because an animation sequence is involved, the duration may also define a time period for each iteration of the sequence to be 10,000 milliseconds.

Continuing with the example, the object location may establish a reference position in terms of X and Y logical coordinates for the initial presentation location of the circle. The object location may also define positional and time offsets for the object. For example, the iteration of the animation sequence may include four intervals, with the first interval assigned positional offset of 150 logical coordinates from the reference X coordinate with no offset with respect to the reference Y coordinate and a time offset of 25% of the duration of the iteration, or 2,500 milliseconds. The second interval may be assigned a positional offset of 150 logical coordinates from the reference Y coordinate and no offset in relation to the previous X offset and a time offset of 50% of the duration of the iteration, or 5,000 milliseconds. Positional and time offsets may also be realized for the remaining intervals, and the iteration may repeat itself for the duration of the scene. In this example, the animation sequence may result in the circle following a square path for each iteration. Any of these object characteristics that enable movement of the object upon its rendering may be referred to as values that define one or more motion vectors for the object.

In the case of an animation sequence, the positioning and timing offsets (and thereby, the intervals of an iteration) may establish key frames for the sequence. As an option, the media player 215 may be configured to interpolate the object (when rendered) between these key frames to provide the illusion of smooth movements or transitions for the element related to the object during the presentation.

In another embodiment, one or more objects may be nested under a parent object that can provide reference data for the nested objects to enable the nested objects to be grouped together as a collection of objects. This feature may be useful for animating a collection of presentation elements associated with the grouped objects. In this example, any timing or positional offsets of the nested objects may be based on corresponding offsets that are defined in the parent object.

As previously noted, the presentation elements associated with an object may be visual in nature, although these elements may take on other forms. For example, if the presentation element is a sound, the presentation system 200 may generate and play it through any suitable interface, such as the speakers of the displays 110 of the room 100. If the positioning of the sound is irrelevant for purposes of its presentation, the corresponding object may not require positional information, although certain temporal aspects, like start times, time offsets, or durations, may still be required. Omitting positional information with respect to the sound may result in the sound being played on one or more of the speakers in a conventional sense.

In another example, however, positional information may be included in the object associated with a sound. For instance, if the sound represents the operation of a moving train, the object may define reference logical coordinates and positional offsets (with timing information). In such a case, the speakers may be mapped against the logical grid 305, like the displays 110, and a speaker may broadcast the sound based on its positioning with respect to the logical grid 305 and the positioning information related to the sound. As a result, animated sequences may be achieved with audio only or a combination of audio and video, with a user possibly experiencing a Doppler effect with respect to the audio. As another example, positional information may be used to restrict the emission of a sound to a certain speaker (or speakers) or audio channel (or channels). Additionally, positional information related to depth may also be employed, which may produce effects along the Z axis. For example, as the logical coordinates related to the Z axis increase in value for the object over time, the corresponding sound element may appear to move away from a user. This effect may be achieved by correspondingly adjusting the audio level of the relevant speakers.

These concepts may also apply to haptics, when such elements are part of the presentation, either alone or in combination with other presentation elements. For example, devices that produce tactile sensations may be strategically positioned in the room 100, and one or more haptic elements may be selectively presented on these devices in accordance with some predefined routine. For example, a vibration effect may be presented in accordance with a sequence in which vibration devices of the room 100 chronologically activate in a direction along the X axis. Of course, other forms of human-perceptible elements that are presented in accordance with one or more other predefined routines may be part of the description herein.

Referring back to FIG. 4 (and FIGS. 1-3), the content 400 that is presented here may form part of a scene 405 that is played on the room 100. In this example, the content 400 may include one or more presentation elements 410 that are rendered from objects. The media players 215 may have received the objects and processed them to determine whether and when the presentation elements 410 are to be presented on the corresponding displays 110 as part of the scene 405. For example, the media players 215 may parse the received objects and compare the positional information of the objects with the regions 307 of logical coordinates associated with the corresponding displays 110. If a media player 215 determines the positional information of an object is within the scope of the region 307 of logical coordinates, the media player 215 may render the object for presentation on the corresponding display 110.

As an example, one of the presentation elements 410 that is presented may be a graphical entity, such as the word "Welcome" with exclamation marks, and each of the displays 110 of the room 100 may show a portion of this element 410. As an option, the text displayed here may include an animation sequence in which it moves along the room 100 from left to right, which may be repeated after it disappears from display 6. Moreover, the logical coordinates of the displays 110 may be successive, which can facilitate the appearance of a smooth transition for the word as it moves across the room 100. Different effects may be realized from the existence of the gap 320. For example, the animation may ignore the logical coordinates of the gap 320, which can cause the characters of the word to appear to jump suddenly from the right side of displays 1 and 4 to (respectively) the left side of displays 2 and 5 as they move across the room 100. In another example, the logical coordinates of the gap 320 may be part of the positional information for the object. In this scenario, the characters of the word may seem to disappear for a short time behind the gap 320, and the overall speed of the animation from left to right may appear to remain substantially the same, meaning the movement may seem more fluid in comparison to the animation ignoring the logical coordinates of the gap 320. As can also be seen in this example, portions of some of the characters of the word may be shown on two separate displays 110 simultaneously. In view of the synchronization maintained by the media players 215, however, the overall presentation of the word 410 may be orderly maintained, even in the case of an animation sequence.

Although the content 400 presented on the scene 405 may include any number of presentation elements 410 that originate from rendered objects, the content 400 is not necessarily limited to such an arrangement. For example, one or more images may also be part of the scene, and these images may be distinct from the presentation elements 410 associated with the objects. As a specific example, one or more of the displays 110 may be configured to play one or more background images, and the presentation elements may be presented as part of or over the background images. A background image may be a visual image, although other content may form a background image, such as background audio, and this other content may be combined with the visual image or played separately from it. An example of a background visual image may be a background of a solid color to be shown by each of the displays 110 of the room 100.

Background images may be defined at the level of the media player 215, or they may originate from some other device. A background image may also be defined as a permanent part of the room 100 such that it is presented indefinitely as part of the room 100. In another arrangement, the background images may also be defined by one or more objects in accordance with the description above, meaning a background image may also be considered a presentation element 410. Because a background image, such as in the case of a visual image, may occupy the entire screen of a display 110, the positional information of the relevant object may be correspondingly set to cover the entire region of local coordinates for the display 110.

To be clear, when one or more objects are rendered, the objects may form the entire image for one or more (including all) of the displays 110 of the room 100. When rendered, these objects may form part of an image for one or more (including all) of the displays 110 of the room 100. In the case of the latter, additional content beyond that provided by the object may form part of the image. The term "object(s) intended to be at least part of an image" is defined as object(s) intending to form the entire image or only a portion of the image."

As noted above, an object may include retrieval information to enable the media player 215 to fetch some content for purposes of the presentation. The content may be retrieved from any suitable location, and any object including retrieval information may be delivered to the media players 215 in time to permit them to retrieve and generate the content. In accordance with this arrangement, the presentation system 200 may be designed such that the media players 215 are responsible for rendering all or substantially all the content that may be part of a scene.

No matter the content to be presented on the room 100, the rendering of such content may occur at the level of the media players 215. That is, the room server 205 may simply deliver a set of objects to the media players 215, and the media players 215 determine whether (and when) to render the object. In addition, the rendered object—if visual in nature—may be shown at the native resolution of the corresponding display 110. Thus, the room server 205 is not required to render an image in its entirety and then split the image into separate components for delivery to the individual media players 215.

If the room server 205 were to render the image, the image would have to account for all the pixels of each of the displays 110. As the number of displays 110 in the room 100 increases (and/or if their native resolutions increase), the single image rendered by the room server 205 would become unwieldy in size and extremely difficult to manage. Animations created in this fashion would be virtually impossible to generate. The room server 205 may indeed reduce the resolutions of the segments of the single image when delivered to the media players 215 for presentation, and the media players 215 could then scale the segments to the native resolutions of the displays 110. Nevertheless, the visual content experienced by a viewer would be less than satisfactory because the scaling process could not replace the lost data resulting from the earlier reductions of segment resolutions.

In an alternative arrangement, the room server 205 may be configured to take a more active management role in the delivery of content to the media players 215. For example, the media players 215 may provide to the room server 205 their regions 307 of logical coordinates, and the room server 205 may selectively deliver objects to the media players 215 based on the portions of the logical grid 305 with which the media players 215 are associated. This technique may avoid the necessity of distributing all objects to every media player 215 in the room 100, although the media players 215 may still be responsible for determining whether (and when) to render an object that is has received. In another example, the room server 205 can simply multicast a stream of objects, which can avoid the room server 205 having to send an object multiple times based on the number of displays 110 in the room 100.

The presentation system 200, as explained earlier, may include more than one room 100. In one option, the presentation of content in the system 200 may be synchronized across multiple rooms 100. For example, a presentation element 410 presented on a first room 100 may appear to smoothly transition to a second room 100 that is positioned nearby. The first and second rooms 100 may be positioned side-by-side, for example, or the second room 100 may be located behind and above, below, or to the side of the first room 100. The rooms 100 may also be positioned at certain angles with respect to one another. As another example, of at least some portion of a first room 100 is positioned in front of a second room 100, a presentation element 410 may appear to transition from the first room 100 to the second room 100 (and vice-versa), with corresponding changes in depth positioning of the element 410 to provide the effect of the element 410 moving away from or closer to a user experiencing the transition. No matter their orientations, transitions in the presentation of the content may be performed across the different rooms 100.

Figure 5:
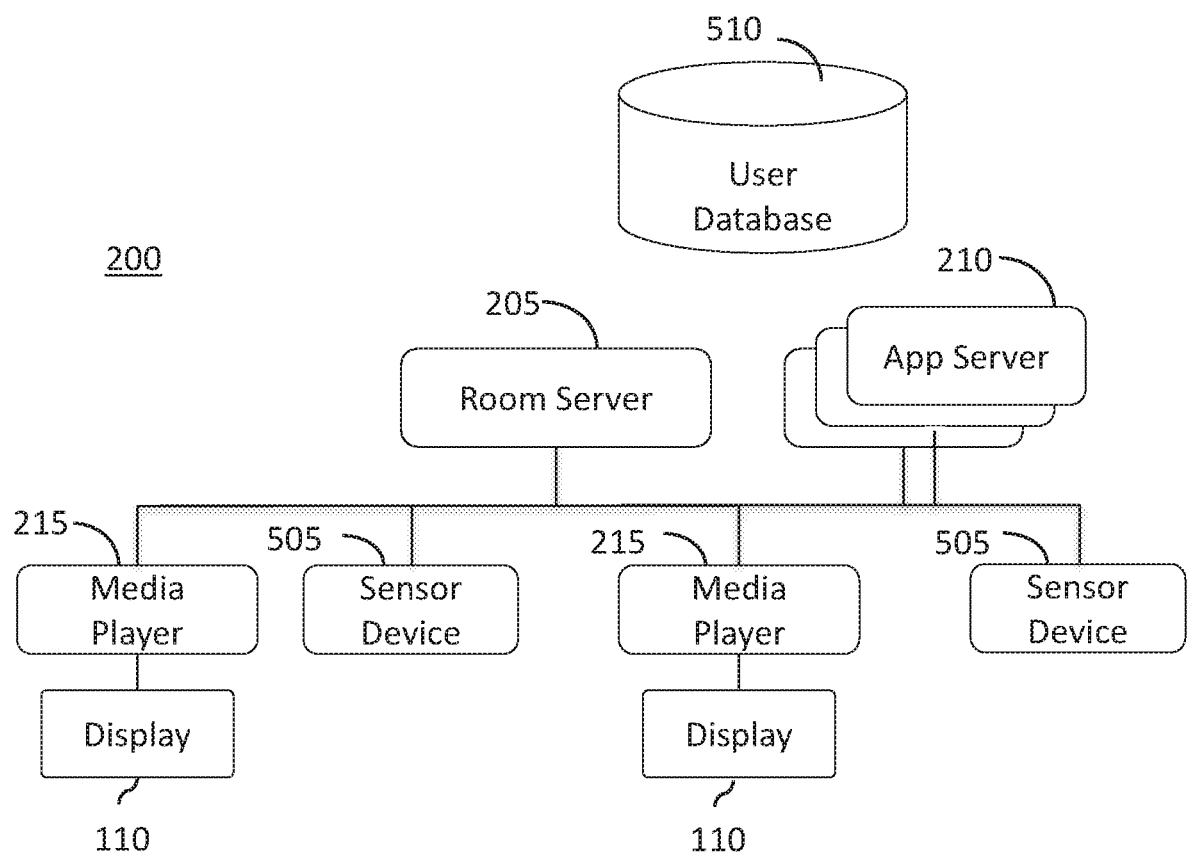
FIG. 5 illustrates another example of a presentation system.

Referring to FIG. 5, another example of a presentation system 200 is shown. In this embodiment, the system 200 can include many of the components shown in and explained in reference to FIG. 2, such as one or more room servers 205, application servers 210, media players 215, networks 220, and displays 110. In addition, this system 200 can include one or more sensor devices 505 and databases 510. A sensor device 505 may be communicatively coupled to a media player 215 and may be configured to detect one or more entities (like humans or machines) or phenomena (like pressures, temperatures, or light). To help explain this system 200, reference may be made to some of the components illustrated in FIGS. 1-4.

As an example, the sensor device 505 may detect and identify human features or devices associated with a user. Examples of a human feature include a face, an iris, or a fingerprint. As part of detecting and identifying the human features, a user may interact directly with the sensor device 505 or indirectly, in which case, the user may interact with an intermediary device (not shown) that communicates with the sensor device 505. Examples of devices associated with a user include mobile phones, radio frequency identification (RFID) tags, Bluetooth beacons, or fobs. Devices associated with a user that can communicate with the sensor device 505 may be collectively referred to as transponders. In many cases, the sensor device 505 may receive from a transponder information about a user over a wireless link, if the user is within an operating range of the sensor device 505. This link may be based on any suitable wireless protocol(s).

In view of this arrangement, the sensor device 505 may be configured to extract an identity of a user. For example, the sensor device 505 could determine the user's identity from an iris or fingerprint scan or from facial recognition. In another example, the transponder may provide the identity of the user, or at least link the user with a specific group of persons. In the latter case, a user's identity may not necessarily be discovered, but the sensor device 505 can determine that the user is, for example, traveling with an identified group or is associated with a certain company. In other cases, the user's identity may remain anonymous, but one or more preferences of the user may still be identified by the sensor device 505 from the information provided by the user's transponder. Alternatively, the sensor device 505 may receive both the user's identity and preferences.

The sensor device 505 may also be configured to determine a proximity of a user, which may be accomplished by determining the signal strength of signals associated with a transponder or the travel time of signals that are exchanged between the sensor device 505 and the transponder. In addition to proximity, the sensor device 505 may also be configured to determine a location of the user with respect to the sensor device 505. Such information may be gleaned from the signals exchanged between the sensor device 505 and the transponder, or the sensor device 505 may be equipped with components for determining the user's location, like a time-of-flight sensor or a sonar unit. In either case, multiple devices (including other sensor devices 505 or entirely different components) may be used to establish or confirm the user's location. As the user moves with respect to the sensor device 505, the user's (determined) location may be correspondingly updated.

In one arrangement, the information obtained by the sensor device 505 may be used to render objects to present certain types of content to a user who is near or otherwise within a certain distance of a room 100. The objects may be pre-existing objects or objects that are dynamically generated based on the information. Moreover, when rendered, the content from the object that is presented may be done so based on the user's identity, associations, location (with respect to the sensor device 505), or preferences. Several examples of this feature will now be described.

Assume the sensor device 505 determines the identity of a user, and the user is standing near the far right of a room 100. The system 200 may generate and render an object that causes a greeting specifically addressing the user to be displayed on the displays 110 that are positioned on the far right of the room 100. In addition, if the user moves towards the left side of the room 100, the greeting may correspondingly follow the user. As another example, the sensor device 505 may not be permitted to learn the actual identity of the user, but the device 505 may determine that the user is an employee of a certain company. In this case, the greeting may not necessarily address the user specifically, but it can refer to the association between the user and the company.

As another example, the sensor device 505 may determine the user's identity and preferences, such as the user's native language or musical tastes. In addition, as part of determining the user's identity, additional data about the user, such as scheduling information on the user's transponder, may be obtained by the sensor device 505. For example, in response to the receipt of this data, the system 200 may generate and render objects that may cause the user's calendar events to appear on the room 100, and a certain genre of music may be played on the room 100. Also, this content may be played on a part of the room 100 that the user is near. Moreover, the information appearing on the room 100 may be in the user's native language. Another example of a preference includes the manner in which the room 100 presents information, such as font size, level of animation, contrast, color, or volume settings.

Information associated with a user may be received at any suitable time. For example, a user may provide his or her preferences through interactions with the transponder prior to being in the range of a room 100. Alternatively, the user could provide such information directly to a user interface of the room 100, which may be part of one or more of the displays 110 or a sensor device 500. As another option, information about the user may be retrieved from the database 510, which may be local or remote to the system 200. The database 510 may even be managed by a third-party that has no connection to the operator of the system 200, other than permitting the sharing of information about the user. Information about or associated with the user may be referred to as an identifying characteristic.

The system 200 may generate other types of objects based on information about the user that it receives. For example, the room 100 may display an avatar, such as an individual visual image or visual animation, associated with the user or show photos the user snapped or currently stores on the user's transponder. As another example, the room 100 may display information about nearby events that may interest the user and can also show a map or directional arrows to indicate the location of such events.

The presentation of information on the room 100 may occur for multiple users. For example, the system 200 may detect the presence of a first user and a second user within a certain distance of the room 100. In one embodiment, the room 100 may simultaneously present information for both the first and second users, although on different portions of the room 100. If desired, some of the presented information may overlap, if at least for a temporary time, such as if two presentation elements are moving towards one another in opposite directions.

Eventually, a sensor device 505 may no longer detect the presence of a certain user (or any user). This absence may be confirmed by other sensor devices 505 of the room 100. In response, the system 200 may delete or store the objects that were generated on behalf of the user(s), which may cause the room 100 to play a default presentation. Once a user is again detected, the system 200 may exit this default state and may again present material associated with the user.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein.

Furthermore, arrangements described herein may take the form of a computer program product embodied in one or more computer-readable media having computer-readable-program code embodied (e.g., stored) thereon. Any combination of one or more computer-readable media may be utilized. The computer-readable medium may be a computer-readable signal medium or a computer-readable storage medium. The phrase "computer-readable storage medium" is defined as a non-transitory, hardware-based storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable storage medium may be transmitted using any appropriate systems and techniques, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects herein can be embodied in other forms without departing from the spirit or essential attributes thereof.

Accordingly, reference should be made to the following claims, rather than to the foregoing specification, as indicating the scope hereof.

What is claimed is:

1. A presentation system, comprising: a room that is configured to play a scene, wherein the room is comprised of a collection of displays, the room having one or more gaps positioned between the displays, each display and gap being defined by logical coordinates within the room; a plurality of media players that are communicatively coupled to the displays and are configured to manage the playing of content on a corresponding display of the collection of displays; and a room server that is communicatively coupled to the media players, wherein the room server is configured to receive one or more objects and distribute the objects to the media players, wherein the scene comprises the objects and the objects are to be selectively played on the displays when the scene is played on the room, and wherein each respective object of the one or more objects includes an object directive that creates or modifies the respective object; wherein the media players are further configured to: receive one or more of the objects from the room server; determine whether the received objects are intended to be played on at least some portion of the corresponding displays the media players manage as part of the scene to be played on the room based on the logical coordinates of the corresponding displays and the logical coordinates of the gaps; and if the objects are intended to be played on at least some portion of the corresponding displays as part of the scene, render, on the corresponding displays on which the objects are intended to be played, a first portion of the objects associated with the logical coordinates of the corresponding displays without rendering a second portion of the objects associated with the logical coordinates of the gaps based on the object directive of the objects, thereby bypassing the rendering of the scene as a whole by the presentation system and selectively causing portions of the objects to not appear within the gaps.

2. The presentation system of claim 1, further comprising an application server that is communicatively coupled to the room server, wherein the application server is configured to define and generate the objects and to transmit them to the room server.

3. The presentation system of claim 1, wherein the objects define one or more object characteristics, wherein the object characteristics include object type, object retrieval information, object start time and duration, object sensory traits, object location, or object time offsets.

4. The presentation system of claim 1, wherein some of the objects are nested under a parent object that provides reference data for the nested objects to enable the nested objects to be grouped together as a collection of objects.

5. The presentation system of claim 1, wherein the room is defined by a logical grid comprised of logical coordinates identifying a presentation location of an object within the scene played on the room and the objects include respective logical coordinates of the logical grid in which to present the objects within the scene played on the room.

6. The presentation system of claim 5, wherein the displays are defined by regions of the logical coordinates of the logical grid that are proportional to the physical sizes of the displays.

7. The presentation system of claim 6, wherein the displays of the room have predetermined resolutions and wherein as part of rendering the received objects on the corresponding displays on which the objects are intended to be played, the media players are further configured to render the objects to the resolutions of the corresponding displays managed by the media players.

8. The presentation system of claim 7, wherein at least one of the corresponding displays managed by the media players has a first resolution and at least another one of the corresponding displays has a second resolution, wherein the first resolution does not match the second resolution.

9. A system for rendering images, comprising: a room that comprises a collection of displays to collectively play a scene that is defined by a logical grid with each display and one or more gaps between the displays being defined by regions of logical coordinates within the logical grid; a first media player that is communicatively coupled to a first corresponding display that is part of the collection of displays and is configured to manage the first corresponding display; and a second media player that is communicatively coupled to a second corresponding display that is part of the collection of displays and is configured to manage the second corresponding display; wherein the first media player is further configured to: receive one or more objects that each includes a directive that creates or modifies the objects and logical coordinates at which to present the objects in the room; determine whether the objects are intended to be at least part of an image intended to be shown by the first corresponding display as part of the scene for the room based on the logical coordinates of the objects and the region of logical coordinates for the first corresponding display in the room; and if the objects are intended to be at least part of the image: determine whether the region of logical coordinates for a first gap adjacent to the first corresponding display exceeds a granularity of the logical grid; if the region of logical coordinates for the first gap exceeds the granularity of the logical grid, determine display effects of the objects for the first gap that selectively cause portions of the objects to not appear in the first gap as the objects move within the scene; and render a first portion of the objects associated with the region of logical coordinates for the first corresponding display only on the first corresponding display as part of the scene for the room without rendering a second portion of the objects associated with the region of logical coordinates for the first gap based on the directive of the objects and the display effects; wherein the second media player is further configured to: receive one or more objects that each includes a directive that creates or modifies the objects and logical coordinates at which to present the objects in the room; determine whether the objects are intended to be at least part of an image intended to be shown by the second corresponding display as part of the scene for the room based on the logical coordinates of the objects and the region of logical coordinates for the second corresponding display in the room; and if the objects are intended to be at least part of the image: determine whether the region of logical coordinates for a second gap adjacent to the second corresponding display exceeds the granularity of the logical grid; if the region of logical coordinates for the second gap exceeds the granularity of the logical grid, determine display effects of the objects for the second gap that selectively cause portions of the objects to not appear in the second gap as the objects move within the scene; and render a first portion of the objects associated with the region of logical coordinates for the second corresponding display only on the second corresponding display as part of the scene for the room without rendering a second portion of the objects associated with the region of logical coordinates for the second gap based on the directive of the objects and the display effects; wherein the first media player and the second media player are configured to render the objects as part of the scene for the room independently of and discretely from one another.

10. The system of claim 9, wherein the first media player is further configured to render the objects on the first corresponding display based on a native resolution of the first corresponding display.

11. The system of claim 10, wherein the second media player is further configured to render the objects on second corresponding display based on a native resolution of the second corresponding display.

12. The system of claim 9, further comprising a room server communicatively coupled to the first and second media players and configured to distribute the objects to the first and second media players.

13. The system of claim 9, wherein the displays of the collection of displays have resolutions and the room has a resolution and wherein the room resolution is dissociated from the display resolutions.

14. The system of claim 13, wherein the room resolution is based on the logical grid that employs logical coordinates.

15. The system of claim 14, wherein the region of the logical coordinates of the logical grid that defines each display is based on the physical sizes of a displayable area of the displays.

16. A method of rendering a scene on a collection of displays, wherein each display has a native resolution, comprising: providing a plurality of objects that are assigned positioning information with respect to a logical grid without selecting which displays are to render the objects, wherein the logical grid defines the scene across the collection of displays with the displays and gaps between the displays being defined by regions of logical coordinates within the logical grid; determining whether the objects, based at least in part on the positioning information and the regions of logical coordinates of the displays, are to be included as at least part of a plurality of images that are to collectively form the scene when the images are shown on the collection of displays; if the objects are to be included as at least part of the plurality of images: determining display effects of the objects for the gaps that selectively cause portions of the objects to not appear in the gaps as the objects move within the scene; and using native resolutions of the displays to render and display a first portion of the objects associated with the regions of logical coordinates of the displays on the collection of displays to form the scene without rendering and displaying a second portion of the objects associated with the regions of logical coordinates of the gaps based on the display effects for the gaps; wherein the native resolutions of the displays are independent of the logical grid.

17. The method of claim 16, wherein the positioning information of the objects includes logical coordinates that are part of the logical grid.

18. The method of claim 16, wherein at least some of the native resolutions of the displays are dissimilar.

19. The method of claim 16, further comprising:
receiving input that includes one or more identifying characteristics of one or more persons;
generating the objects based on the identifying characteristics of the person; and
rendering for display on the collection of displays the objects based on the identifying characteristics of the person when the person is within a predetermined distance of the collection of displays.

20. The method of claim 16, wherein the positioning information includes a mapping between a plurality of logical coordinates on the logical grid and a plurality of time offsets indicating when the objects are to be presented in the scene at a corresponding logical coordinate in the scene.

* * * * *